UNITED STATES PATENT OFFICE.

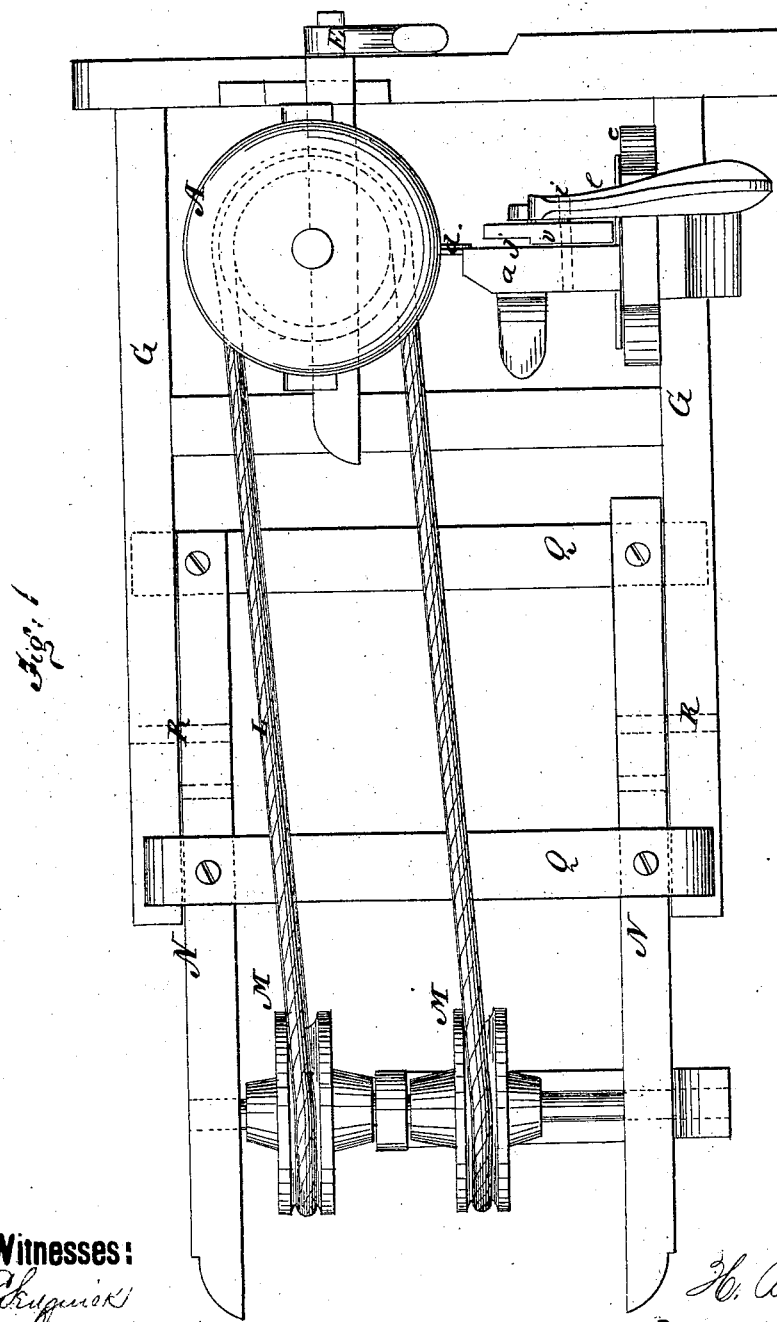

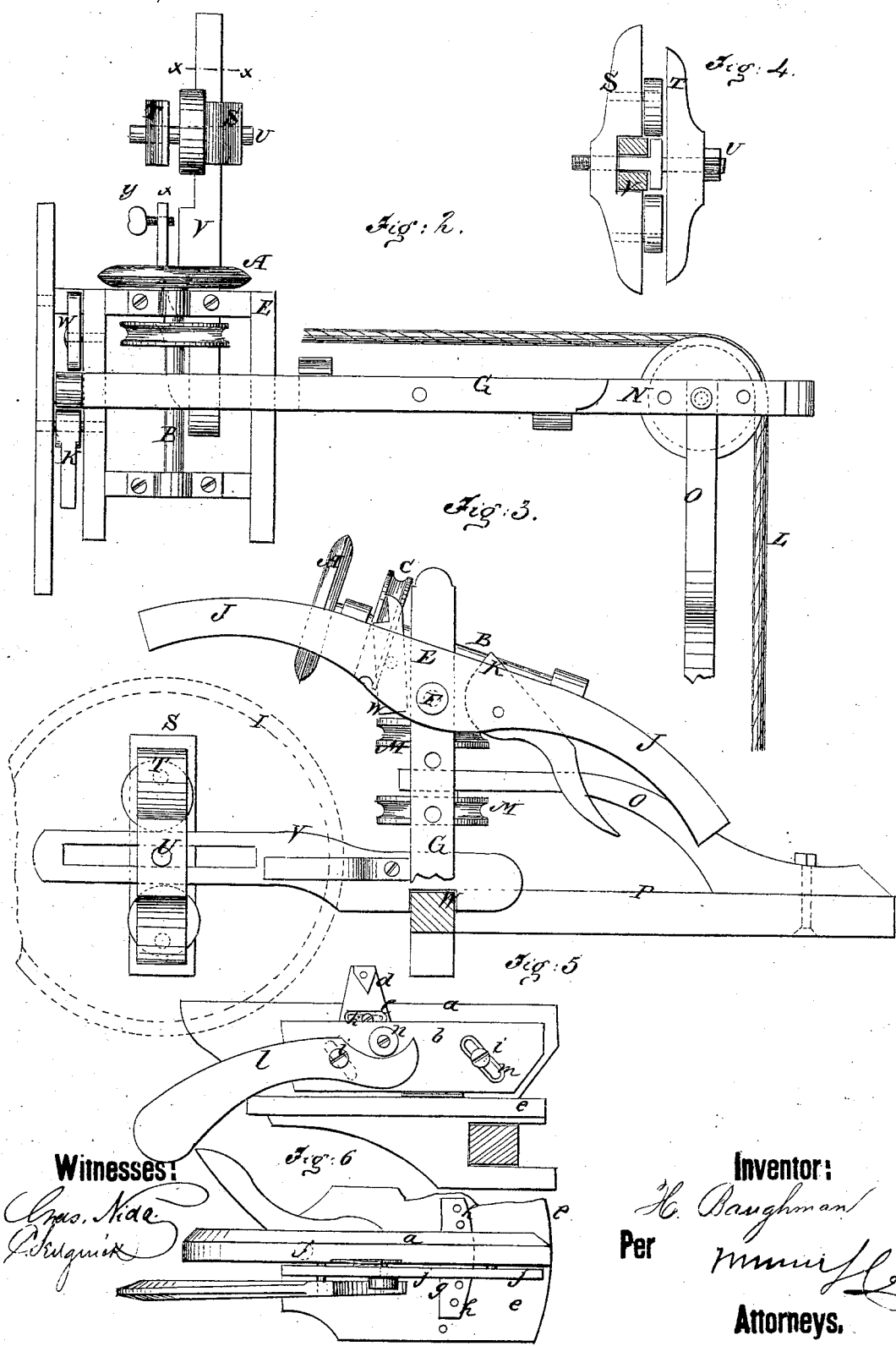

HENRY BAUGHMAN, OF DORN'S GOLD MINE, SOUTH CAROLINA.

IMPROVEMENT IN SAW-GUMMING MACHINES.

Specification forming part of Letters Patent No. 145,327, dated December 9, 1873; application filed August 26, 1873.

*To all whom it may concern:*

Be it known that I, HENRY BAUGHMAN, of Dorn's Gold Mine, in the county of Abbeville and State of South Carolina, have invented a new and Improved Saw-Gumming Machine, of which the following is a specification:

The invention will first be fully described, and then pointed out in the claims.

Figure 1 is a front elevation of my improved gumming-machine with the straight-saw holder. Fig. 2 is a plan view of my improved machine with the circular-saw holding attachment. Fig. 3 is a side elevation of Fig. 2 with a part broken out. Fig. 4 is a section of a portion of Fig. 2 on the line $x\,x$, showing the circular-saw holder. Fig. 5 is a front elevation of the long-saw holder; and Fig. 6 is a plan view of the long-saw holder.

Similar letters of reference indicate corresponding parts.

A represents the emery or vulcanite gumming-wheel; B, the mandrel; C, the driving-pulley; and E, the frame, on which the said tool is mounted. This frame is mounted, near its middle, on the pivot F, which is arranged in the vertical frame G. The tool A overhangs this oscillating frame at one end, so as to be presented to a circular saw in the position indicated in dotted lines I, and the frame has two handles, J, by which to swing the frame up and down to present the tool A to the saw and remove it. The eccentric dog K regulates the depth of the cuts in the saw by the tool A by coming against the side of the frame G. It can be set for cutting deep or shallow notches by turning it on its pivot. The tool is driven by a belt, L, operated by any suitable driving mechanism, and working around the guide-pulleys M, mounted in an extension-frame, N, with braces O P adapted for connection with frame G by sliding between the upper and lower bars, with its cross-bars Q and fastening-bolts R so contrived that it will be made fast by inserting the bolts, and may be shifted to tighten or loosen the belt by sliding toward or from the gumming-tool, all as clearly shown in Fig. 1. This frame is to be fastened to any suitable support behind the saw when a large saw is to be gummed; but for other saws it will be fastened on the floor or a bench of any suitable kind. The contrivance for holding small circular saws consists of the clamp S T and center pin U, fitted on the slotted bar V, which is detachably connected to frame G at W, so as to hold the clamp and center in the relation to the tool A, represented in Figs. 2 and 3. The clamps slide along the slotted bar V, through which the center pin passes, and are secured at any point for saws of any size by nuts on the center pin screwing all fast. X is a bar with a gage-screw, Y, for controlling the edge of the saw by being screwed fast against the bar V during the operation of the gumming-tool. It is released to shift the saw. The apparatus for holding the straight saws consists of the jaws $a$, guide $d$, and the attaching plate or bar $e$, the said bar or plate being attached to the frame G at W, as the circular-saw holder is. The jaw $a$ is pivoted to the holder $e$ at $f$, to swing right or left for beveling the teeth by the gumming-tool, and has a fastening-plate, $g$, attached to it, and arranged relatively to plate $e$, and provided with a series of holes, $h$, to fasten it by a pin, and other holes in plate $e$ at any point, as may be required. The jaw $b$ is connected to the jaw $a$ by screw-bolts $i$, and it is recessed or rabbeted on the side next to jaw, as shown at $j$, for the saw to rest on at the back, and the rabbet is so formed that the saw bears at the ends only to prevent rolling. The saw, being placed on this rabbet in jaw $b$, is raised up to the gage to be presented to the gumming-tool by the lever $l$, which is pivoted to one of the screws $i$, and engages with the roller $n$ for the purpose. The gage $d$ shifts the saw relatively to the tool A by acting against the point of one of the teeth, which is forced against it as the saw is raised. The gage is adjustable toward and from the gumming-tool A, to adapt it for gaging saws with coarse or fine teeth. It is made fast to the jaw $a$ by a screw, $k$, passing through the slot $l$ for shifting it; but any other suitable mode of holding it adjustably may be employed. The slots $m$ in the jaw $b$ for its fastening-bolts $i$ are made oblique, so that said jaw moves endwise, and shifts the saw along the gumming-tool when it is let down to lower the saw, so that the points will pass under the gage. The saw is prevented from being shifted back again when the jaw rises by the gage acting on a tooth. A stop-button, $w$, is employed with the frame E, to engage with the frame G, and hold the frame E when gumming straight saws, which are moved up to it instead of moving the tool down to the saw, as when gumming round saws. The frame E is weighted, so that the end on which the tool A is mounted is borne upward.

Having thus described my invention, I claim as new and desire to secure by Letters Patent—

1. The combination of the stop-button w with the oscillating frame E, stationary frame G, and the rotary gumming-tool, substantially as specified.

2. The adjustable circular-saw clamp S T, center U, and the holder V, combined with the oscillating rotary gumming-tool A, and detachably connected to the supporting-frame of said tool, substantially as specified.

HENRY BAUGHMAN.

Witnesses:
J. H. JENNINGS,
I. A. REYNOLDS.